(12) United States Patent
Ruan et al.

(10) Patent No.: US 9,904,868 B2
(45) Date of Patent: Feb. 27, 2018

(54) VISUAL ATTENTION DETECTOR AND VISUAL ATTENTION DETECTION METHOD

(71) Applicant: OMRON Corporation, Kyoto-shi, Kyoto (JP)

(72) Inventors: Xiang Ruan, Otsu (JP); Huchuan Lu, Dalian (CN)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/237,817

(22) Filed: Aug. 16, 2016

(65) Prior Publication Data

US 2017/0091573 A1 Mar. 30, 2017

(30) Foreign Application Priority Data

Sep. 29, 2015 (CN) .......................... 2015 1 0633327

(51) Int. Cl.
| | |
|---|---|
| G06K 9/46 | (2006.01) |
| G06F 17/30 | (2006.01) |
| G06N 5/02 | (2006.01) |
| G06T 7/00 | (2017.01) |
| G06K 9/00 | (2006.01) |
| G06K 9/32 | (2006.01) |

(52) U.S. Cl.
CPC ....... G06K 9/4604 (2013.01); G06F 17/3082 (2013.01); G06K 9/00771 (2013.01); G06K 9/4623 (2013.01); G06K 9/4642 (2013.01); G06N 5/02 (2013.01); G06T 7/0081 (2013.01); G06K 2009/3291 (2013.01)

(58) Field of Classification Search
CPC ........ G06F 17/3082; G06K 2009/3291; G06K 9/00771; G06K 9/4604; G06K 9/4623; G06K 9/4642
See application file for complete search history.

(56) References Cited

U.S. PATENT DOCUMENTS

| | | | |
|---|---|---|---|
| 2012/0301105 A1 | 11/2012 | Rehg et al. | |
| 2012/0321181 A1* | 12/2012 | Yang | G06K 9/00751 382/165 |
| 2014/0304236 A1 | 10/2014 | Hachiya | |
| 2016/0267179 A1* | 9/2016 | Mei | G06F 17/30837 |

FOREIGN PATENT DOCUMENTS

JP  2010-258914 A  11/2010

OTHER PUBLICATIONS

Ji Rongrong et al., Actor-independent action search using spatiotemporal vocabulary with appearance hashing, Pattern Recognition, Mar. 1, 2011, pp. 624-638, vol. 44, No. 3, Elsevier, New York, NY, USA.

* cited by examiner

*Primary Examiner* — Phuoc Tran
(74) *Attorney, Agent, or Firm* — Metrolexis Law Group, PLLC

(57) ABSTRACT

A visual attention detector includes a feature extraction unit configured to extract a spatiotemporal feature from a local region in a video; a hashing unit configured to convert a spatiotemporal feature value for the local region into a hash value, and to select a training value mapped to the hash using a hash table; and an attention measure determining unit configured to determine an attention measure on the basis of the distance between a spatiotemporal feature value for the local region and the selected training value such that the larger the distance the larger the attention measure.

21 Claims, 12 Drawing Sheets

VISUAL ATTENTION DETECTOR AND VISUAL ATTENTION DETECTION METHOD

FIELD

This disclosure relates to techniques for predicting a region within a video likely to attract visual attention.

BACKGROUND

There are techniques known, for instance from Japanese Unexamined Patent Application Publication No. 2010-258914, which use image analytics to automatically detect regions in an image likely to visually attract a person's attention, or that are abnormal (hereafter, these kinds of regions are referred to as "visual attention regions"). These kinds of techniques are referred to as visual attention detection, or saliency detection, or the like, and have been gaining lots of attention as important key features in the field of computer vision. Visual attention detection for video in particular, is expected to have application in various fields; for instance, using surveillance cameras to detect unusual or abnormal circumstances, or in the automatic operation of vehicles or robots.

Algorithms for visual attention detection can be largely divided into model-based techniques or learning-based techniques. In a model-based technique, image features that should be determined as abnormal are presented as the model, and the regions having these kinds of image features are extracted from an image. However, positing unknown abnormal states is non-trivial, and it tends to be extremely difficult to implement a model capable of supporting a variety of real world events. In contrast, a learning-based technique uses a large quantity of training data to learn the image features that should be determined as normal or abnormal. The advantage is that the learning-based method can provide a simpler way of building a highly accurate detector without requiring models or hypotheses. Unfortunately, this method is highly dependent on the training data; thus, the detection accuracy deteriorates when the training data is unsuitable. There are also cases where over time the subject being monitored, the situation, and the environment changes, and the knowledge gained through training becomes unsuitable even when the detector is trained in advance with suitable training data. In such a cases, new training data corresponding to the current situation must be prepared and used to retrain the detector, and maintenance of the detector is a hassle.

Technical Problem

Given the foregoing issues, an object of an embodiment of the invention is to provide a novel algorithm for visual attention detection in videos that can be easily implemented and is of superior reliability.

The proposed algorithm for visual attention detection in videos is also capable of flexibly adapting to changes in the detection target or environment, or the like.

SUMMARY

With the above in mind, the invention may adopt the following configurations.

Specifically, a visual attention detector according to an aspect of the invention detects regions in a video likely to attract visual attention, and includes: a feature extraction unit configured to extract a spatiotemporal feature from a local region in a video, a spatiotemporal feature representing a spatial and a temporal change in an image in the local region; a hashing unit configured to convert a spatiotemporal feature value for the local region into a hash value using a hash function, and to select a training value mapped to the hash value for the local region using a hash table wherein a training value learned in advance for a spatiotemporal feature is registered in a bucket mapped to a hash value; and an attention measure determining unit configured to determine an attention measure on the basis of the distance between a spatiotemporal feature value for the local region and the selected training value such that the larger the distance the larger the attention measure.

Note that a "spatiotemporal feature" can be considered an index that quantifies the movement or changes in the subject within the video. Consequently, a "training value for a spatiotemporal feature" represents a normal state of change or movement in the subject (a normal value), whereas, a "spatiotemporal feature value in a local region" represents the movement of or changes in the subject detected from the video being analyzed, in other words a spatiotemporal feature value represents the current state. Accordingly, evaluating the size of the distance between a "spatiotemporal feature value in a local region" and the "selected training value" is equivalent to evaluating how much the current movement of or changes in the subject differs from its normal state. A subject's movement or change that differs from a normal state usually tends to attract a person's visual attention. Therefore, determining an attention measure on the same basis, the size of the distance between a "spatiotemporal feature value in a local region" and the "selected training value" as in the aspect of the invention allows for accurate detection (prediction) of a visual attention region.

The aspect of the invention also selects a training value mapped to the hash value for the local region using a hash table wherein a training value learned in advance for a spatiotemporal feature is registered in a bucket mapped to a hash value. Hereby, the training value distribution that should be compared to the spatiotemporal feature value for the local region may be simply and quickly selected from among all the training values.

Moreover, the aspect of the invention may use training only for registering training values to the hash table without needing the design of a complicated model as required by conventional model-based techniques. Consequently, this simplifies implementation of a visual attention detector. Another advantage is that the algorithm may be flexibly modified for changes in the detection target or environment by merely updating the hash table.

The training value may be the spatiotemporal feature value extracted from a video capturing an identical subject under identical parameters as the video being processed during a predetermined time period. Thus the normal states of movement or change in the subject within a video may be appropriately learned by selecting this kind of training video.

The hashing unit includes a plurality of hash tables; the attention measure determining unit may use each hash table in the plurality of hash tables to calculate a plurality of attention measures and may combine the plurality of attention measures to determine a final attention measure. The reliability of the attention measure results calculated may deteriorate due to a bias in a distribution of training values or a bias in the hash function. At that point, combining a plurality of the calculation results using the plurality of hash tables as above-mentioned improves the reliability of the visual attention detection.

The visual attention detector may further include a hash table updating unit configured to register a spatiotemporal feature value for the local region as a new training value in the hash table to thereby update the hash table. Hereby, the hash table may be additionally trained using the current state (the spatiotemporal feature value for the local region); therefore, the reliability of the visual attention detection may be improved.

The hash table updating unit may update the hash table by deleting a bucket having less than a threshold number of training values registered therein. Using a bucket with few training values is likely to increase the prediction error in the attention measure. Consequently, deleting a bucket with few training values so that the bucket is not used when calculating the attention measure thereby improves the reliability and stability of the visual attention detection.

The visual attention detector may further include a foreground extraction unit for extracting a moving region within a frame in the video as a foreground region; and an attention map refining unit for generating a refined attention map from information on the attention measure determined by the attention measure determining unit, and information on the foreground region extracted by the foreground extraction unit so that the attention measure within the foreground region is uniform. Outputting an attention measure for each foreground region (moving region) thereby improves the reliability of the visual attention detection.

Note that a visual attention detector having at least a portion of the above-mentioned features and functions lies within the scope of the invention. Note that a method for visual attention detection having at least a portion of the above-mentioned features and functions lies within the scope of the invention. Moreover, a program for executing these methods on a computer, or a computer readable medium storing such a program are also within the scope of the invention. The above-mentioned processes and features may be freely combined with each other insofar as is technically possible to configure the invention.

Effects

The aspect of invention can provide a novel algorithm for visual attention detection in videos that can be easily implemented and is of superior reliability. The proposed algorithm for visual attention detection in videos is also capable of flexibly adapting to changes in the detection target or environment, or the like.

DETAILED DESCRIPTION

Embodiments of the invention relate to a visual attention detection algorithm that, using a computer for image analysis, automatically predicts regions (i.e., visual attention regions) within a video likely to attract visual attention. The results of visual attention detection is visual attention information; for instance, the visual attention information may be represented as an attention map depicting a distribution of an attention measure for each pixel or small region; or, the visual attention information may be output in the form of a binary image wherein the attention map is converted to binary using a predetermined threshold. This kind of visual attention information is preferably employed in a variety of ways such as preprocessing in a computer vision application, e.g., partitioning image regions (segmentation), image classification, scene interpretation, image compression, facial recognition, and object recognition.

One feature of the visual attention detection algorithm according to embodiments of the invention is that hashing techniques are adopted in evaluating an image feature and in evaluating an attention measure. Hashing is a technique used in various fields such as data searching, encryption, and electronic certification; however, there are no known examples of hashing being adopted in the visual attention detection.

Examples of specific embodiments of a visual attention detection algorithm according to the invention are described below with reference to the drawings. However, the embodiments described below are merely examples of a preferred configuration, and are in no way meant to limit the scope of the invention.

First Embodiment

Device Configuration

Figure 1:
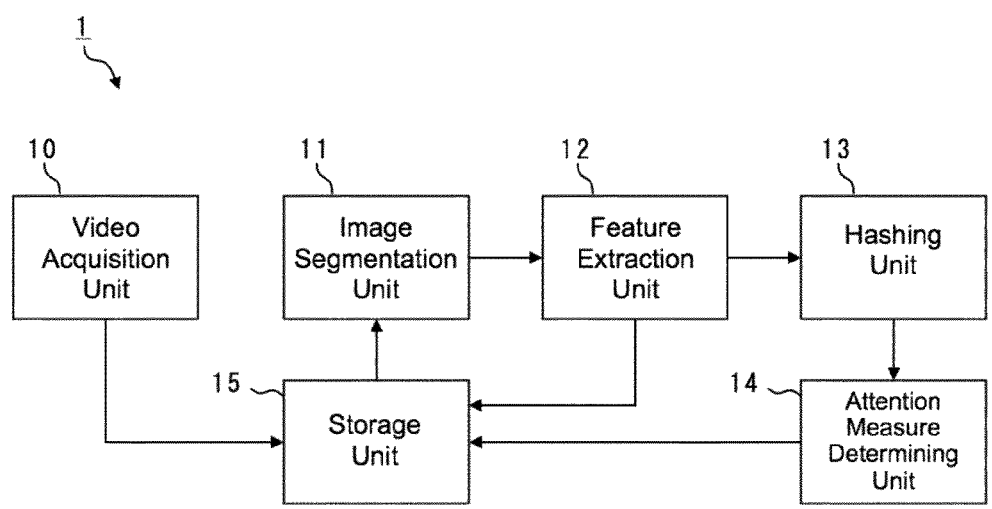
FIG. 1 is a block diagram representing the functions of a visual attention detector according to a first embodiment.

FIG. 1 is a block diagram representing the functions of a visual attention detector according to a first embodiment. The visual attention detector 1 in FIG. 1 includes mainly, a video acquisition unit 10, an image segmentation unit 11, a feature extraction unit 12, a hashing unit 13, an attention measure determining unit 14, and a storage unit 15.

The video acquisition unit 10 acquires the video that will be examined. The video acquisition unit 10 may acquire video data from an imaging device (e.g. a video camera), or may read video data from a storage device or from a server on a network. In this embodiment the video data is a 30-frame-per-second gray scale video acquired from a surveillance camera. However, the video format is not particularly limited, and a color video may be used. The input video acquired is stored in the storage unit 15.

Figure 2:
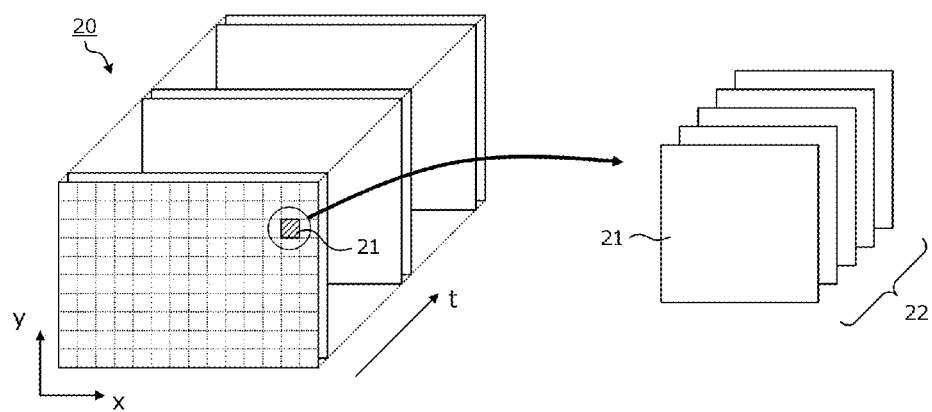
FIG. 2 is a schematic of the relationship between an input video, a local image, and an image block.

The image segmentation unit 11 divides the input video along a timescale (t), and along spatial coordinates (x, y), to generate a plurality of image blocks. An image block is a set of images made up of local images of an identical spatial position from a plurality of frames, and is referred to as a cuboid or a spatiotemporal image. An image block may be thought of as a video of a localized time period in a local region within the input video. In the embodiment, image features are extracted and evaluated on an image block basis to define the spatial and temporal changes in an image. FIG. 2 is a schematic of the relationship between an input video 20, a local image 21, and an image block 22. For instance, when the input video 20 is a one-minute VGA (640×480 pixels) video running at 30 frames per second, and an image block 20 is five frames of 5×5 pixels, then the input video 20 is segmented into 73,728 image blocks 22.

The feature extraction unit 12 extracts spatiotemporal features from each image block 22. A spatiotemporal feature is an image feature representing both the spatial changes and the temporal changes in an image, and is an index quantifying the movement or changes in the subject (a person or an object, or the like) within a video. While in the embodiments a Histogram of Optical Flow (HOF) is used to represent the spatiotemporal features, other types of spatiotemporal features such as motion vectors may be used for this algorithm.

Figure 3:
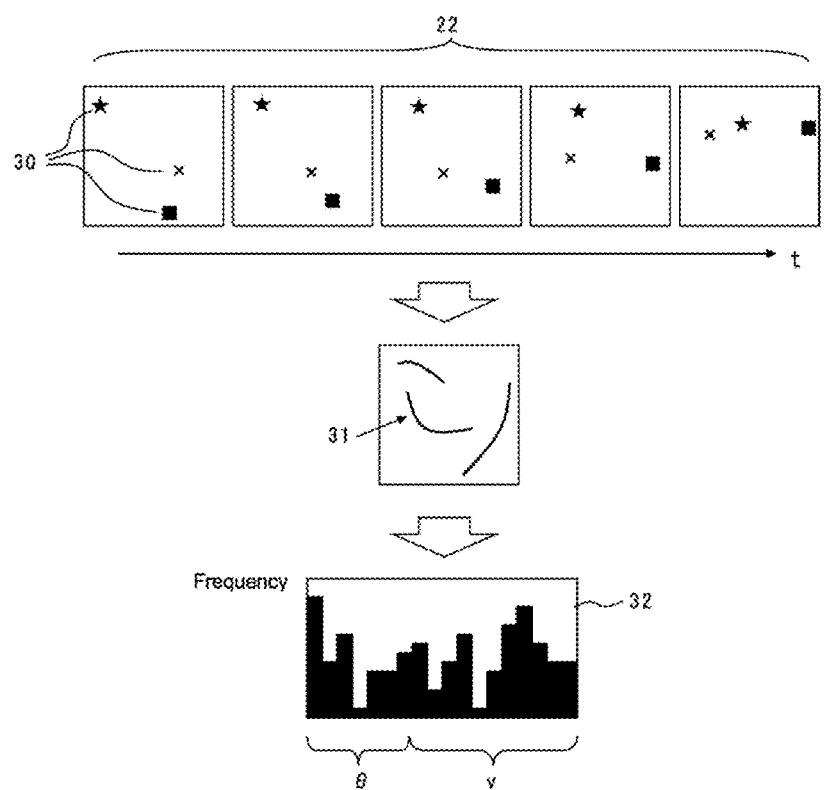
FIG. 3 is a diagram of the HOF concept.

FIG. 3 diagrams the HOF concept. The feature extraction unit 12 searches each frame in an image block 22 for feature points 30, and searches for movement of the feature points 30 by mapping the feature points 30 between frames. This movement of the feature points 30 is referred to as an optical flow 31. The feature extraction unit 12 then obtains the direction (angle) θ, and speed (intensity) v of the optical flow for each of the feature points 30, and plots frequency of the direction θ and the speed v of the optical flow 31 of each of the feature points 30 in a histogram 32 with the direction θ and the speed v along the horizontal axis. This kind of operation is used to convert the plurality of optical flows 31 extracted from the image block 22 into a single histogram 32. This histogram 32 is an HOF. For example, when the direction θ is separated into eight bins, and the speed v is separated into 10 bins, the HOF becomes an 18-dimensional feature vector.

The hashing unit 13 uses a hash function to convert the value of the spatiotemporal feature into a hash value, and references a hash table to obtain the entry mapped to that hash value.

The hash function converts the data input therein (in this embodiment the HOF), into a hash value that is made up of a simple bit string. Various kinds of hash functions have been heretofore proposed, and any kind of hash function may be used in this algorithm. Below is an example of using locality-sensitive hashing (LSH). LSH is advantageous because, for instance, no teaching signals are required when generating the hash function, the function is fast, and there is a high probability that similar data is converted to the same hash value, and the like; and so LSH is effective for the real time analysis of the kinds of video signals that would be handled by this embodiment.

Figure 4:
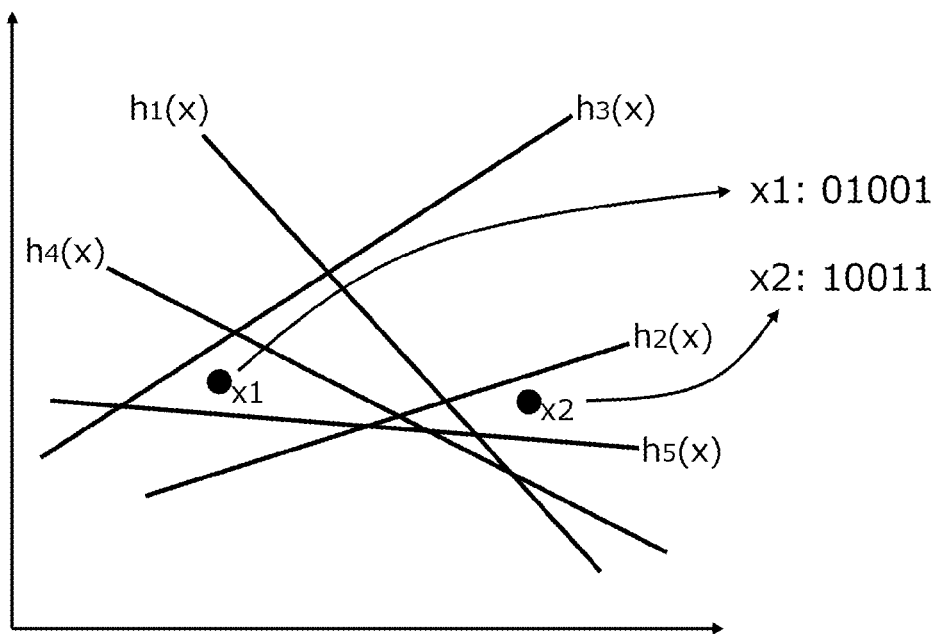
FIG. 4 is a diagram outlining a hash function concept, specifically of locality-sensitive hashing (LSH)

FIG. 4 is a diagram outlining a hash function concept, specifically of locality-sensitive hashing (LSH). An LSH hash function g(x) is composed of k number of hyperplanes h(x)–hk(x) randomly distributed over an n-dimensional feature space. Although FIG. 4 depicts an example where n=2 and k=5 (and in this case, the hyperplanes are straight lines), for the sake of convenience, when implementing the algorithm the feature space may have several to several hundred dimensions n, and there may be several to several hundred hyperplanes k.

When a feature value x (where x is an n-dimensional vector) is input into the hashing unit 13, the hashing unit 13 determines whether the value x is on the positive or negative side of the hyperplane h1(x), and encodes the location of the value x as 1 (positive) or 0 (negative) for the hyperplane h1(x). The hashing unit 13 carries out identical determinations for the remaining hyperplanes h2(x)–hk(x), and creates a k-bit hash value by combining the individually encoded k bits. In the example illustrated in FIG. 4, the value x1 is negative in h1(x), h3(x), and h4(x), and positive in h2(x), and h5(x); therefore, the hash value for the value x1 is "01001". Furthermore, the value x2 is negative in h2(x) and h3(x), and positive in h1(x), h4(x), and h5(x); therefore, the hash value for the value x2 is "10011".

Figures 5A, 5B:
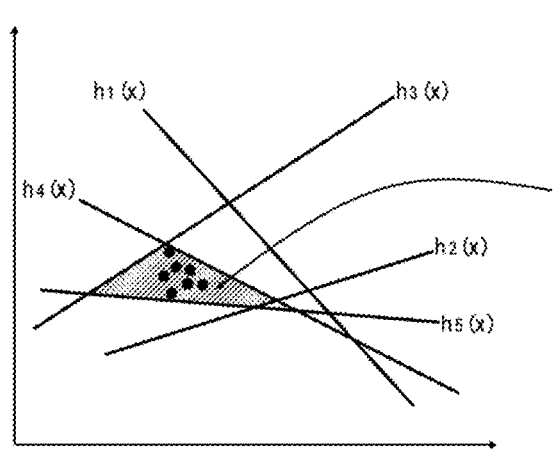
FIG. 5A outlines a hash table.
FIG. 5B is a schematic representation of the relationship between a hash table, a hash function, and an entry.

FIG. 5A outlines a hash table. A hash table is an array of data made up of a plurality of buckets; each bucket contains a hash value and an entry mapped to the hash value, and the hash value serves as an index to the bucket. In the embodiment, the sample data for a spatiotemporal feature that generates a given hash value is registered in a bucket as an entry mapped to that hash value. Sample data may be the data acquired and accumulated through training using the video.

FIG. 5B is a schematic representation of the relationship between a hash table, a hash function, and an entry. A subspace segmented by the hash function (into hyperplanes h1(x)–hk(x)) is mapped to buckets in the hash table, and the sample data plotted in the subspace is mapped to an entry registered in a bucket. As can be understood from FIG. 5B, two or more entries may be registered to a single bucket; conversely, there may be buckets that do not include a single entry.

The attention measure determining unit 14 uses the hashing results to obtain attention measures for each of the image blocks 22 and generate an attention map. The attention measure determining unit 14 is described later in detail.

The visual attention detector 1 may be composed of, for instance, a computer equipped with a CPU (processor), a memory, and auxiliary storage device, an input device, a display device, and a communication device. Each function illustrated in the visual attention detector 1 (FIG. 1) may be implemented by loading a program stored in the auxiliary storage device into memory, and running the program on the CPU. However, all or a portion of the functions of the visual attention detector 1 may be implemented as circuits on an ASIC or an FPGA or the like. Alternatively, all or a portion of the functions of the visual attention detector 1 may be implemented through cloud computing or distributed computing.

Training with the Hash Table

Figure 6:
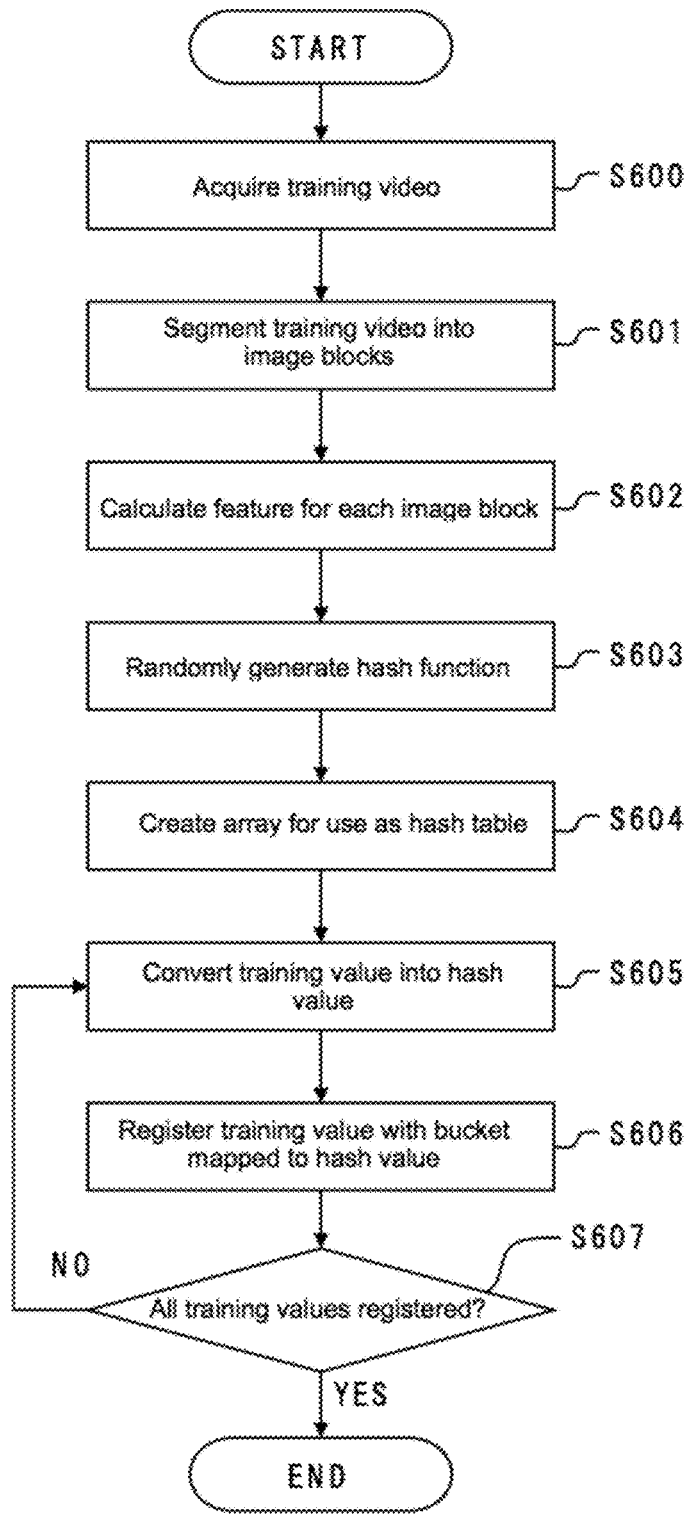
FIG. 6 is a flowchart of the hash table training process.

Details of the visual attention detector 1 training with a hash table are described with reference to FIG. 6. FIG. 6 is a flowchart of the hash table training process. The hash table training process generates a new hash function or a new hash table, and may be executed when the visual attention detector 1 is installed or begins operation.

The video acquisition unit 10 obtains the video used for training in step S600. The training video may be a video captured for a predetermined period for an object captured such as a place, or a subject, and imaging conditions such as the angle, magnification, exposure, frame rate, and the like, that are identical to the types of videos that will be processed for visual attention detection (later described). Selecting a training video in this manner, allows the algorithm to learn the normal state of movement or change in the subject within a video. For instance, if the visual attention detector 1 is adopted in a surveillance camera for detecting abnormalities, a video captured by the surveillance camera over a few minutes or a few hours may be used for training.

In step S601 the image segmentation unit 11 divides the training video into image blocks (FIG. 2). In step S602 the feature extraction unit 12 calculates the features in each image block. The feature data calculated at this point are stored in the storage unit 15. Note that the processing in steps S601 and S602 may be executed consecutively each time the required number of frames of the video data is read (i.e., five frames in the example in FIG. 2).

After acquiring the training feature data as above described, control transitions to generating a hash function and a hash table. In the embodiment, a plurality of sets of hash functions and hash tables are created from the same training feature data to improve the reliability of the hashing process.

First, the hashing unit 13 randomly generates hash functions (i.e., k hyperplanes; step S603), generates an array of 2 k new buckets for use in the hash table, and initializes each bucket (Step S604). Next, the hashing unit 13 takes out a single value from the training feature data (hereinafter, training value) and converts the training value to a hash value using the hash function generated in step S603 (Step S605). The hashing unit 13 registers the training value in the bucket mapped to the hash value obtained in step S605 (step S606). After executing the steps S605 and S606 for all the training values contained in the training feature data (step S607), the hash table is complete.

Further, repeating the steps S603 to S607 L times creates L sets of hash functions and hash tables. The value of L may be selected as desired through experimentation or experience (in the embodiment, assume L=10). The hash table training process is hereby complete.

The Visual Attention Detector

Figure 7:
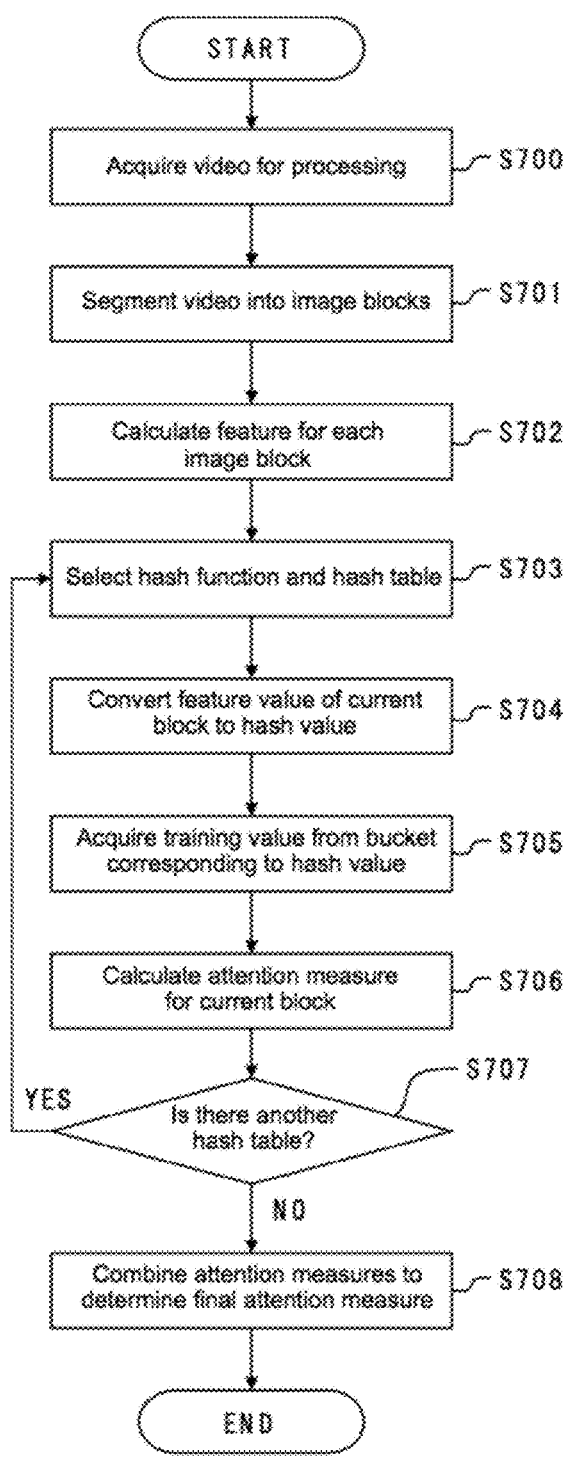
FIG. 7 is a flowchart of a visual attention detection process.

Details of the visual attention detection process in the visual attention detector 1 are described with reference to FIG. 7. FIG. 7 is a flowchart of a visual attention detection process. The visual attention detection process is executed continually or periodically while the visual attention detector 1 is running.

The video acquisition unit 10 obtains the video to be analyzed in step S700. For instance, the video acquisition unit 10 may acquire five frames of video data from a surveillance camera. In step S701 the image segmentation unit 11 divides the training video into image blocks (FIG. 2). In step S702 the feature extraction unit 12 calculates the features in each image block. The feature data calculated at this point are stored in the storage unit 15.

Subsequently, the processes in steps S703 to S708 are run in order on each of the image blocks within the video. Hereafter, the "current block" refers to an image block being processed.

First, the hashing unit 13 converts the values of the features in the current block into a hash value using the i-th hash function, where i=1 to L (steps S703, S704). The hashing unit 13 acquires an entry (training value) in the bucket mapped to the hash value for the current block from the i-th hash table (step S705). If there is not at least one training value contained in the bucket mapped to the hash value (hereafter, empty bucket), instead of processing the empty bucket, an entry may be acquired from a bucket containing the closest training value to the value of the feature in the current block (referred to as a neighboring bucket). The training value obtained in step S705 is referred to hereafter as a "mapped training value". A mapped training value may often include a plurality of training values, however there are cases where the mapped training value contains only a single training value.

The attention measure determining unit 14 then computes an attention measure for the current block on the basis of the distance between the value of the feature in the current block and the mapped training value in a feature space (step S706). In the embodiment an attention measure $A_i(z)$ is computed for the current block using the following formula.

$$A_i(z) = 1 - \frac{1}{1 + \exp(-\lambda(r_m/\|z - c_m\|_2^2 - 1))} \qquad \text{Formula 1}$$

Figure 8:
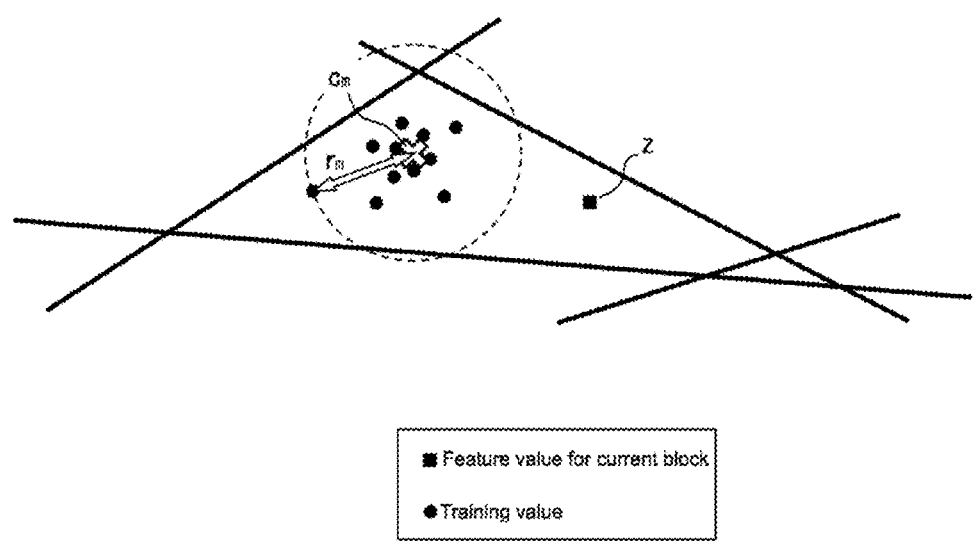
FIG. 8 is a diagram for explaining the formulas used to calculate an attention measure.

Here, "i" is the number of the hash table, where i=1–L; z represents the value of the feature (feature vector) for the current block; $c_m$ is the center (center of gravity) for the distribution of mapped training values; and $r_m$ is distance between the center (center of gravity) and an outermost training value in the distribution of mapped training values (FIG. 8).

The processes in steps S703 through S706 are repeated while changing the hash functions and hash tables selected, to thereby compute L number of attention measures $A_1(z)$–$A_L(z)$. Finally the attention measure determining unit 14 combines the attention measures $A_1(z)$–$A_L(z)$ obtained with each of the hash tables to thereby compute a final attention measure $A(z)$. Any desired method may be used to combine the attention measures; in the embodiment the following kind of weighted sum formula is used.

$$A(z) = \sum_{i=1}^{L} \alpha_i A_i(z) \qquad \text{Formula 2}$$

Here, $\alpha_i$ is a weight that may be established as appropriate based on experimentation or experience. For instance, the reliability of the hash table may be evaluated and a hash table with a low reliability given a smaller weight, while a hash table with a high reliability is given a larger weight. The reliability of a hash table may be evaluated using the distribution of the training values within each bucket, the degree of separation between training value distributions between buckets, or the bias in the number of training values between buckets. Of course, all the weights may be made equal by, for instance $\alpha_1, \ldots, \alpha_L=1/L$, or the like.

Figure 9:
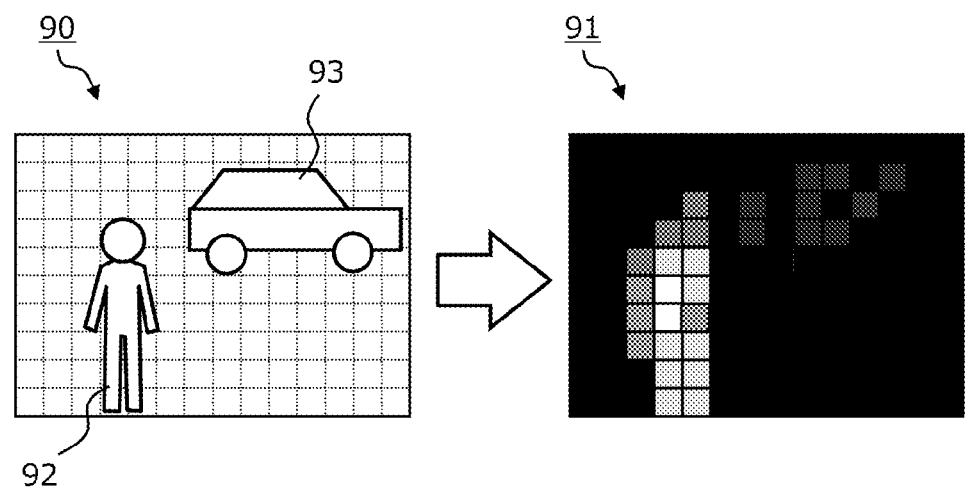
FIG. 9 diagrams an example of a video and an attention map.

Once an attention measure $A(z)$ is computed for all the image blocks in a video, the attention measure determining unit 14 generates an attention map. FIG. 9 diagrams an example of a video 90 and an attention map 91. The attention map 91 represents the attention measure for each image block in gray scale, where, the brighter (i.e., the closer to white) the image block, the higher the attention measure. Although the video 90 represents a person 92 and an object (a vehicle) 93 as the moving subjects, only the region including the person 92 has a larger attention measure in the attention map 91. For example, images of a traveling vehicle are commonplace (normal) in a video from a surveillance camera along a highway; however, an image of a person walking along the highway would be out of place (abnormal). In such a situation, the region including the person 92, which is where there is abnormal movement, is detected as having larger attention measure. This kind of attention map is saved in the storage unit 15 or output to an external device, for use in various computer vision applications such as object recognition, image recognition or the like.

Advantages of the Embodiment

A training value registered in the hash table for a spatiotemporal feature represents a normal state of change or movement in the subject (a normal value), whereas, the feature value for a current block represents the movement of or changes in the subject detected from the video being analyzed, in other words, the feature value for the current block represents the current state. Accordingly, evaluating the size of the distance between a feature value in a current block and the mapped training value in the feature space is equivalent to evaluating how much the current movement of or changes in the subject differs from its normal state. A subject's movement or change that differs from a normal state usually tends to attract a person's visual attention. Therefore, the visual attention detection algorithm of the embodiment is capable of accurately detecting (predicting) a visual attention region.

The embodiment also selects a training value mapped to the hash value for the current block using a hash table wherein a training value learned in advance for a spatiotemporal feature is registered in a bucket mapped to a hash value. Hereby, the training value distribution that should be compared to the spatiotemporal feature value for the current block may be simply and quickly selected from among all the training values.

Moreover the embodiment may use training only for registering training values to the hash table without needing the design of a complicated model as required by conventional model-based techniques. Consequently, this simplifies implementation of a visual attention detector. Another advantage is that the algorithm may flexibly modified for changes in the detection target or environment by merely updating the hash table. Finally, the embodiment uses a plurality of hash tables, and combines the plurality of calculation results to obtain a final attention measure; therefore, with this embodiment it is possible to suppress degradation of the reliability of the visual attention detection due to bias in the training value distribution, or bias in the hash function, or the like to thereby implement highly reliable visual attention detection.

Second Embodiment

The attention map constructed in the first embodiment uses the attention measures calculated per image block; consequently, there are cases where an attention measure distribution does not coincide with the regions identified in the video (i.e., the person 92, and the vehicle 93). However, visual attention is usually drawn toward a person or an object; therefore it is preferable then that the attention measures are output per region for a person or an object and not per image block. Therefore, a second embodiment may be configured to extract a foreground region in the video, and to refine the attention map on the basis of that foreground region.

Figure 10:
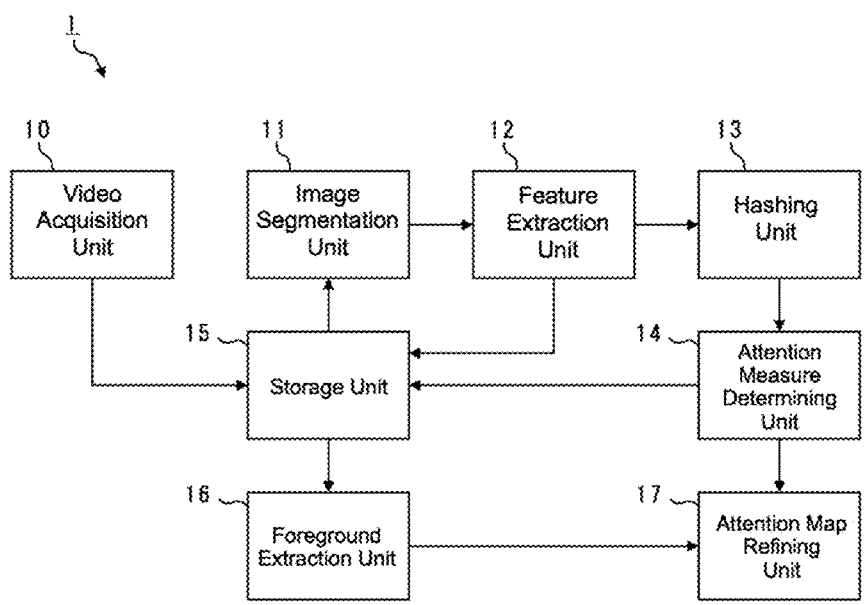
FIG. 10 is a block diagram representing the functions of a visual attention detector according to a second embodiment.

FIG. 10 is a block diagram representing the functions of a visual attention detector 1 according to the second embodiment. The difference with the first embodiment (FIG. 1) is the presence of a foreground extraction unit 16 and an attention map refinement unit 17. All other components are identical to the configuration in the first embodiment.

The foreground extraction unit 16 extracts a "moving region" within a frame in a video for use as the foreground region. More specifically, the foreground extraction unit 16 uses the optical flow obtained when the feature extraction unit 12 calculates the spatiotemporal features, and determines the foreground region as those regions where the intensity of the optical flow (speed) is greater than a threshold. Using this already generated optical flow minimizes the amount of calculation needed for foreground extraction, and speeds up processing. Note that despite the increase in computations that would be needed compared to the optical flow algorithm used in this embodiment, other foreground extraction algorithms such as video segmentation, or motion clustering may be used.

The attention map refinement unit 17 refines the attention map on the basis of information on the foreground region obtained from the foreground extraction unit 16 so that the attention measures within each of the foreground extraction regions are uniform. More specifically, when a plurality of image blocks overlaps within a single foreground region, the attention map refinement unit 17 sets the attention measure for that foreground region to the maximum attention measure in the overlapping image blocks.

Figure 11:
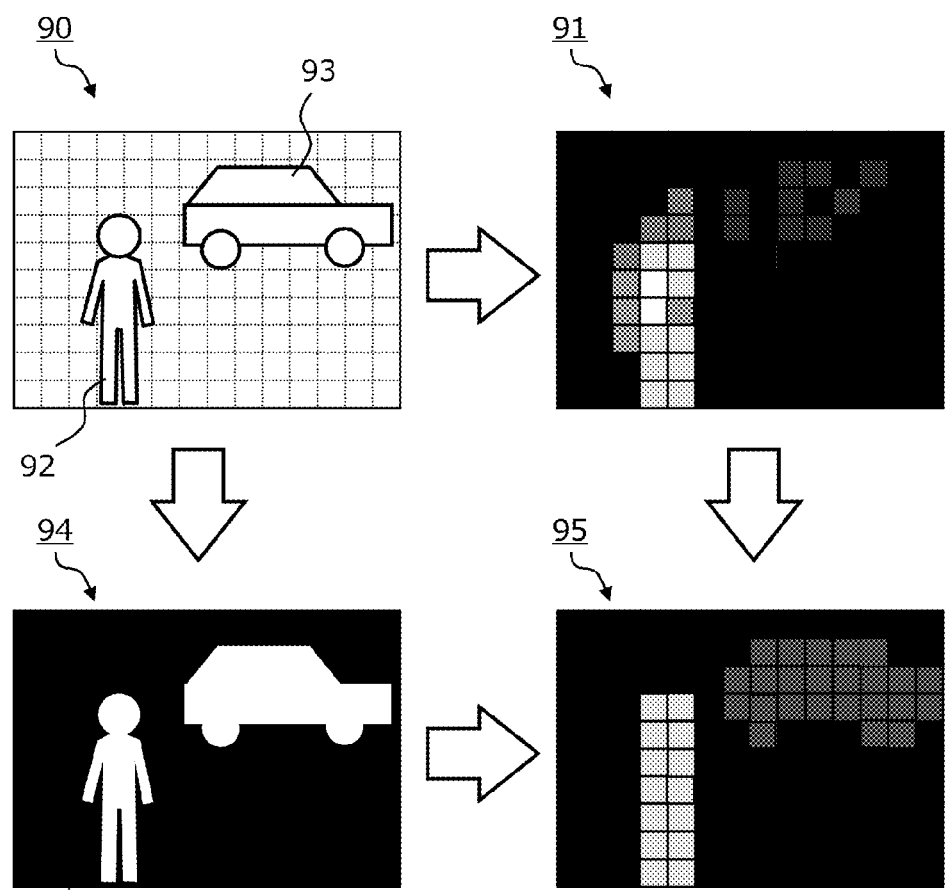
FIG. 11 is a diagram for explaining the refinement of an attention map using foreground region information.

FIG. 11 depicts examples of the video 90, the attention map 91, foreground region information 94, and a refined attention map 95. It can be understood from FIG. 11 that the refined attention map includes smoother attention measures, and the attention measures are more uniform per region. In this manner the embodiment outputs an attention measure for each foreground region (moving region) and thereby improves the reliability of the visual attention detection.

Third Embodiment

Figure 12:
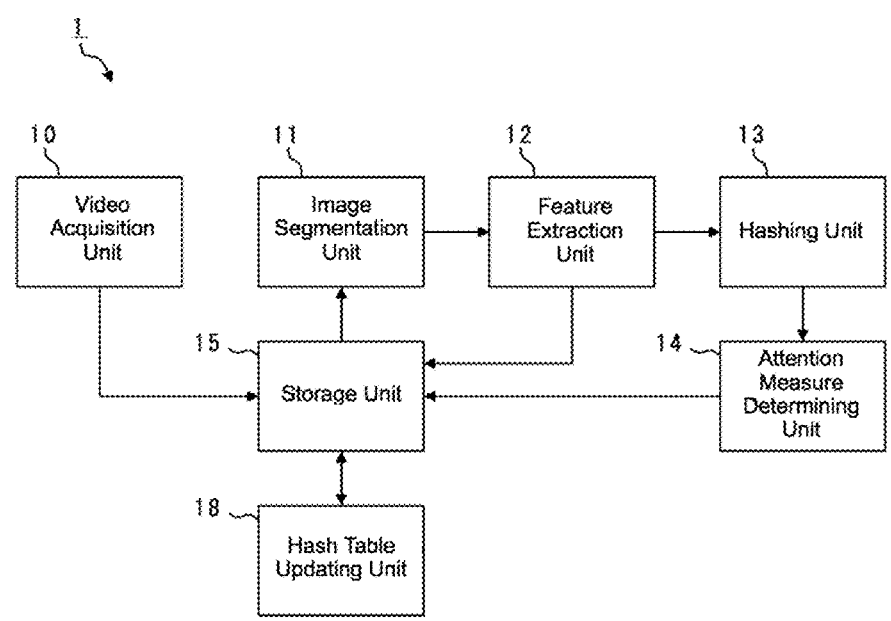
FIG. 12 is a block diagram representing the functions of a visual attention detector according to a third embodiment.

FIG. 12 is a block diagram representing the functions of a visual attention detector 1 according to a third embodiment. The difference with the first embodiment (FIG. 1) is the presence of a hash table updating unit 18. All other components are identical to the configuration in the first embodiment.

The hash table updating unit 18 performs online updating of the hash tables. Here, "online" means while the visual attention detector is operating (running). More specifically, the hash table updating unit 18 periodically performs the following two kinds of updating: "additions" or "deletions" (e.g., once every 30 minutes, once per day, once a week, or the like).

Additions

An "addition" is an updating operation where the spatiotemporal feature value obtained from a video being process is registered to a hash table as a new training value. This kind of updating operation additionally trains the hash table on the current state, and therefore improves the reliability of the visual attention detection.

All the values obtained from the video currently being processed may be added to the hash table; however, this may dramatically increase the number of entries registered in the hash table, which raises issues such as reduced storage capacity, and reduced processing speed. Accordingly, instead of adding all the values, it is preferable to only add those training values that satisfy a predetermined criterion.

For instance, in step S705 (FIG. 7), when the bucket corresponding to the hash value for the current block is empty, the attention measure determination unit calculates an attention measure A(z) using a training value contained in a neighboring bucket instead of the empty bucket. At this point, if the attention measure A(z) calculated is smaller than a threshold THa (i.e., if it is determined that there is normal movement in the current block), then the storage unit 15 may temporarily store the feature value of the current block. In this manner, on collecting a set number of feature values would belong to an empty bucket but are determined to be normal, the hash table updating unit 18 may register those feature values in an empty bucket of the hash table. The number of buckets used for calculating the attention measure increases, and thereby improves the reliability of hashing and the reliability of the visual attention detection.

Deletion

A "deletion" is an updating operation whereby the buckets containing less than a threshold Tb number of registered training values are deleted. To "delete a bucket" means to delete all the training values registered in the bucket (i.e., emptying the bucket). Using a bucket with few training values is likely to increase the prediction error in the attention measure. Consequently, deleting a bucket with few training values so that the bucket is not used when calculating the attention measure thereby improves the reliability and stability of the visual attention detection.

As above described, the embodiment implements automatic online updating of a hash table, and therefore allows the algorithm to flexibly adapt to changes, such as in the detection target or the environment.

Additional Considerations

The above-described embodiment is merely one specific example of the invention, and in no way is it meant that the scope of the invention is limited to said specific example. For example, the online updating function described for the third embodiment may be built into the device according to the second embodiment. Additionally, while the example provided through the third embodiment only adds and deletes training values from an existing hash table, a device according to the third embodiment can also use the feature values accumulated in the storage unit 15 to generate a new hash table.

The invention claimed is:

1. A visual attention detector for predicting a region in a video likely to attract visual attention, the visual attention detector comprising:
a processing circuit configured to perform operations comprising:
operation as a feature extraction unit configured to extract a spatiotemporal feature from a local region in a video, a spatiotemporal feature representing a spatial and a temporal change in an image in the local region;
operation as a hashing unit configured to:
convert a spatiotemporal feature value for the local region into a hash value using a hash function, and select a training value mapped to the hash value for the local region using a hash table wherein a training value learned in advance for a spatiotemporal feature is registered in a bucket mapped to a hash value; and
operation as an attention measure determining unit configured to determine an attention measure for the local region based on a distance between the spatiotemporal feature value for the local region and the selected training value such that the larger the distance the larger the attention measure.

2. The visual attention detector according to claim 1, wherein the processing circuit configured to perform operation as the hashing unit such that the training value is a spatiotemporal feature value extracted from a video capturing an identical subject under identical parameters as the video being processed during a predetermined time period.

3. The visual attention detector according to claim 1, wherein:
the processing circuit is configured to perform operations such that:
operation as the hashing unit comprises operation as the hashing unit on a plurality of hash tables; and
operation as the attention measure determining unit comprises operation as the attention measure determining unit configured to compute a plurality of attention measures using each hash table in the plurality of hash tables, and combine the plurality of attention measures to determine a final attention measure.

4. The visual attention detector according to claim 1, wherein the processing circuit is configured to perform operations further comprising:
operation as a hash table updating unit configured to register the spatiotemporal feature value for the local region as a new training value in the hash table so as to update the hash table.

5. The visual attention detector according to claim 4, wherein the processing circuit is configured to perform operations such that operation as the hash table updating unit comprises operation as the hash table updating unit configured to update the hash table by deleting a bucket having fewer than a threshold number of training values registered therein.

6. The visual attention detector according to claim 1, the processing circuit is configured to perform operations further comprising:
operation as a foreground extraction unit configured to extract a moving region within a frame in the video as a foreground region; and
operation as an attention map refining unit configured to generate a refined attention map based on the attention measure determined by the attention measure determining unit and the extracted foreground region such that the attention measure within the extracted foreground region is uniform.

7. The visual attention detector according to claim 1, wherein the processing circuit comprises one of:
a computer equipped with a processor, a memory, and auxiliary storage device, an input device, a display device, and a communication device
an ASIC or an FPGA;
a cloud computing system or distributed computing system.

8. A method of visual attention detection for predicting a region in a video likely to attract visual attention, the method of visual attention detection comprising:
extracting, by a processing circuit, a spatiotemporal feature from a local region in a video, the spatiotemporal feature representing a spatial and a temporal change in an image in the local region;
converting, by the processing circuit, a spatiotemporal feature value of the local region into a hash value using a hash function;
selecting, by the processing circuit, a training value mapped to the hash value for the local region using a hash table, the training value being learned in advance for the spatiotemporal feature and registered in a bucket mapped to a hash value; and
determining, by the processing circuit, an attention measure for the local region based on a distance between the spatiotemporal feature value for the local region and the selected training value such that the larger the distance the larger the attention measure.

9. The method according to claim 8, wherein the training value comprises a spatiotemporal feature value extracted from a video capturing an identical subject under identical parameters as the video being processed during a predetermined time period.

10. The method according to claim 8, wherein
selecting, by the processing circuit, the training value mapped to the hash value for the local region using the hash table, the training value being learned in advance for the spatiotemporal feature and registered in the bucket mapped to the hash value, comprises selecting a plurality of training values mapped to a plurality of hash values for the local region using a plurality of hash tables, the training values being learned in advance for the spatiotemporal feature and registered to buckets mapped to the hash values; and
determining, by the processing circuit, the attention measure for the local region based on the distance between the spatiotemporal feature value for the local region and the selected training value such that the larger the distance the larger the attention measure comprises:
determining a plurality of attention measures for the local region based on distances between the spatiotemporal feature value for the local region and the selected training values, such that the larger the distance the larger the attention measure; and
combining the plurality of attention measures to determine a final attention measure.

11. The method according to claim 8, further comprising updating, by the processing circuit, the hash table by registering the spatiotemporal feature value for the local region as a new training value in the hash table.

12. The method according to claim 11, further comprising deleting, by the processing circuit, a bucket having fewer than a threshold number of training values registered therein.

13. The method according to claim 8, further comprising:
extracting, by the processing circuit, a moving region within a frame in the video as a foreground region; and
generating, by the processing circuit, a refined attention map based on the attention measure and the foreground region, such that the attention measure within the foreground region is uniform.

14. The method according to claim 8, wherein the processing circuit comprises one of:
a computer equipped with a processor, a memory, and auxiliary storage device, an input device, a display device, a communication device;
an ASIC or an FPGA; and
a cloud computing system or distributed computing system.

15. A non-transitory computer-readable medium comprising instructions that, when executed a processing circuit, cause the processing circuit to perform operations to control a visual attention detector, the operations comprising:
extracting a spatiotemporal feature from a local region in a video, the spatiotemporal feature representing a spatial and a temporal change in an image in the local region;
converting a spatiotemporal feature value of the local region into a hash value using a hash function;
selecting a training value mapped to the hash value for the local region using a hash table, the training value being learned in advance for the spatiotemporal feature and registered in a bucket mapped to a hash value; and
determining an attention measure for the local region based on the distance between the spatiotemporal feature value for the local region and the selected training value such that the larger the distance the larger the attention measure.

16. The non-transitory computer-readable medium according to claim 15, wherein the training value comprises a spatiotemporal feature value extracted from a video capturing an identical subject under identical parameters as the video being processed during a predetermined time period.

17. The non-transitory computer-readable medium according to claim 15, wherein the instructions cause the processing circuit to perform operations such that:
selecting the training value mapped to the hash value for the local region using the hash table, the training value being learned in advance for the spatiotemporal feature and registered in the bucket mapped to the hash value comprises selecting a plurality of training values mapped to a plurality of hash values for the local region using a plurality of hash tables, the training values being learned in advance for the spatiotemporal feature and registered to buckets mapped to the hash values; and
determining the attention measure for the local region based on the distance between the spatiotemporal feature value for the local region and the selected training value such that the larger the distance the larger the attention measure comprises:
determining a plurality of attention measures for the local region based on distances between the spatiotemporal feature value for the local region and the selected training values, such that the larger the distance the larger the attention measure; and
combining the plurality of attention measures to determine a final attention measure.

18. The non-transitory computer-readable medium according to claim 15, the instructions cause the processing circuit to perform operations further comprising updating the hash table by registering the spatiotemporal feature value for the local region as a new training value in the hash table.

19. The non-transitory computer-readable medium according to claim 18, the instructions cause the processing circuit to perform operations further comprising deleting a bucket having fewer than a threshold number of training values registered therein.

20. The non-transitory computer-readable medium according to claim 15, the instructions cause the processing circuit to perform operations further comprising:
extracting a moving region within a frame in the video as a foreground region; and
generating a refined attention map based on the attention measure and the foreground region, such that the attention measure within the foreground region is uniform.

21. The non-transitory computer-readable medium according to claim 15, wherein the processing circuit comprises one of:
a computer equipped with a processor, a memory, and auxiliary storage device, an input device, a display device, and a communication device;
an ASIC or an FPGA; and
a cloud computing system or distributed computing system.

* * * * *